Aug. 5, 1947.  W. S. FLETCHER  2,425,033
CLAMPING DEVICE
Filed June 6, 1944
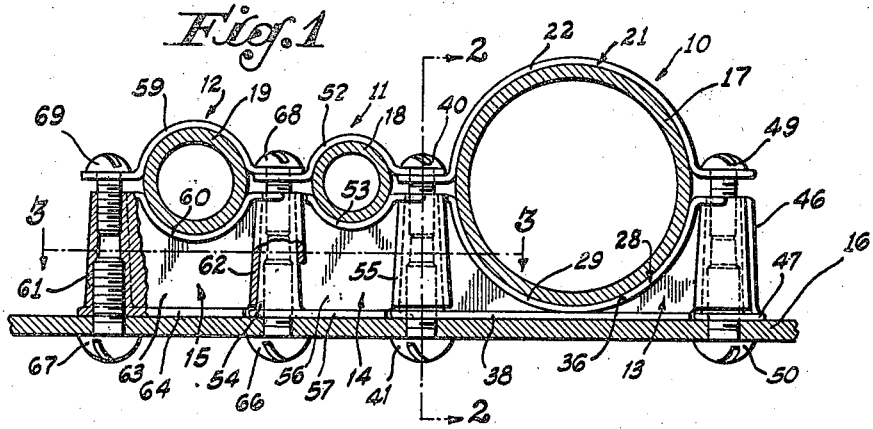
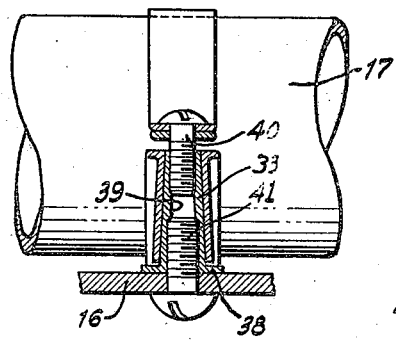
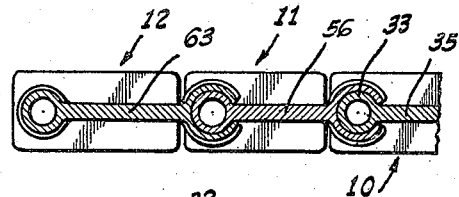
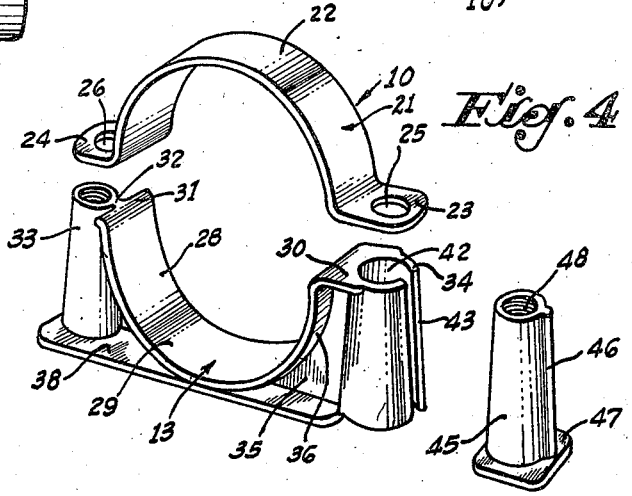
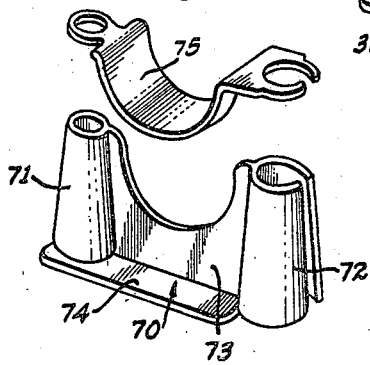
INVENTOR
WENDELL S. FLETCHER
BY HARRIS, KIECH, FOSTER & HARRIS
ATTORNEYS Patented Aug. 5, 1947

2,425,033

UNITED STATES PATENT OFFICE 2,425,033

CLAMPING DEVICE

Wendell S. Fletcher, South Pasadena, Calif.

Application June 6, 1944, Serial No. 538,939

10 Claims. (Cl. 248—68)

My invention relates to clamping devices and, more particularly, to a clamping device adapted to clamp a tubing or cable or the like, or a plurality of the same, relative to a supporting surface.

The problem of mounting a plurality of cables or pipes of different sizes is frequently encountered in the art, where the same must be rigidly supported against relative movement and against vibration. This problem frequently occurs in aircraft construction and in shipbuilding, and has normally been met in the art by custom-making a suitable clamping member to fit over all of the cables or pipes in the particular run. The number of such clamping members required for a particular job may vary from only several to a very large number, and where large numbers of a particular configuration are required, it is usual to make suitable dies and stamp the clamping members. Either practice, as will be appreciated, is slow, expensive, and labor-consuming. Furthermore, errors in measurement of the cables or in the specifications for the clamping devices, which most frequently must be supplied by the workmen on the job, frequently lead to wastage of materials and delays in construction. Since cable or pipe runs vary in the number of cables or pipes, the sizes thereof, and the relative placement thereof, it has been impossible to standardize on clamping members adapted for any desired installation.

It is therefore a primary object of my invention to obviate the foregoing disadvantages by providing a clamping device having interchangeable and replaceable elements so that its parts may be prefabricated and merely assembled on the job for the particular installation encountered. I accomplish this by providing individual clamping elements in varying sizes, each clamping element being adapted to clamp a single cable or pipe, the clamping members being so formed that they can be interlocked in assembly in any desired combination to accommodate any particular cable or pipe run encountered.

A further object of my invention is to provide such clamping elements with a novel form of interlocking construction, by which they can be simply and quickly assembled into an interlocked unitary assembly.

Another object of the invention is to provide, as articles of manufacture, such clamping elements and the parts therefor.

Other objects will appear in the following specification and in the drawing, which is for the purpose of illustration only, and in which:

Fig. 1 is an elevational view, partly in section, of an assembly of clamping elements of my invention.

Fig. 2 is a vertical cross-sectional view taken on the line 2—2 of Fig. 1.

Fig. 3 is a horizontal cross-sectional view taken on the line 3—3 of Fig. 1.

Fig. 4 is a perspective view of one of the clamping elements of my invention.

Fig. 5 is a perspective view of a modification of the clamping elements of the invention.

Referring to the drawing, Fig. 1 shows a clamping device including clamping elements 10, 11, and 12 which include interlocking base elements 13, 14, and 15, respectively, the whole being adapted to be supported on any conventional supporting surface, such as a wall 16, and which is adapted to clamp securely relative to such a supporting surface a plurality of tubings 17, 18, and 19.

As best shown in Fig. 4, the clamping member 10 includes the interlocking base element 13 and a top strap member 21, the latter being provided with a semi-circular central portion 22 and flat ends 23 and 24 having screw holes 25 and 26, respectively, therein. The interlocking base element 13 is provided with a bottom strap member 28 having a semi-circular central section 29 of substantially the same radius as the semi-circular central portion 22 of the top strap member 21, the bottom strap member also having flat end portions 30 and 31, the latter being formed into a thin neck 32, which is suitably secured to or formed integrally with a first frusto-conical supporting post 33. The flat end portion 30 of the bottom strap member 28 is similarly suitably secured to or formed integrally with the top of a second frusto-conical supporting post 34, the supporting posts 33 and 34 being interconnected by a web 35 serving as an integral interconnecting member therebetween and provided with a semi-circular contour joint 36 in which the semi-circular central section 29 of the bottom strap member 28 seats and is supported, the web 35 being of substantially the same thickness as the width of the neck 32. Although, as illustrated in Fig. 4 the bottom strap member 28 is secured to the posts 33 and 34, and the web 35, by casting or otherwise, it will be appreciated that it may be desirable in practice to make the bottom strap as a separate element which merely rests on the posts and web, such a modification being illustrated in Fig. 5, and it is to be understood that I contemplate use of either form within the spirit of my invention. Suitably secured to or formed integrally with the bottom of the first supporting post 33 and the web 35 is a base plate 38 forming a supporting base for the base element 13. As will be noted from Figs. 1 and 4, the base plate 38 extends completely under the first supporting post 33, but does not extend beneath the second supporting post 34, for a purpose to be described hereinafter. The first supporting post 33 is provided with a bore 39, the upper and lower ends of which are threaded to receive machine screws 40 and 41, respectively, the screw 41 being adapted to secure the supporting post 33 to the wall 16, and the screw 40 being for a purpose to be described hereinafter. As will be understood, the bore 39 may be continuously threaded without departing from the spirit of the invention.

The second supporting post 34 is hollow to provide a longitudinal chamber 42 therein, the wall of which is of the same configuration as the exterior of the first supporting post 33. The second supporting post 34 is also provided with a vertical longitudinal slot 43 in the wall thereof for a purpose to be described hereinafter, and being slightly wider than the neck 32.

As shown in Figs. 1 and 4, a third supporting post 45 is also provided. The supporting post 45 is of the same general configuration as the supporting post 33 except that it is provided with a longitudinal rib 46 of substantially the same width as the neck 32 of the first supporting post 33, being adapted to fit into the second supporting post 34, and is provided also with a relatively small base plate 47. As will be understood, the third supporting post 45 is adapted to be inserted into the longitudinal chamber 42 of the second supporting post 34, so as to fill the same, and to provide support for the second supporting post, the rib 46 fitting into the slot 43 to securely lock the supporting post 45 against rotation relative to the post 34. The third supporting post 45 is also provided with a threaded bore 48 adapted to receive machine screws 49 and 50, similarly to the first supporting post 33.

The clamping elements 11 and 12 are generally similar to the clamping element 10, described above, merely being smaller in size to accommodate the different sized pipes 18 and 19 respectively. Thus, the clamping element 11 has top and bottom straps 52 and 53, respectively, similar to the straps 21 and 28 but of smaller radius, the bottom strap 53 being connected to first and second supporting posts 54 and 55, respectively, connected by a web 56 and provided with a base plate 57. Similarly, the clamping element 12 is provided with top and bottom straps 59 and 60, respectively, which are similar in form to the top and bottom straps 21 and 28 but differ merely in radius, a first supporting post 61 and a second supporting post 62, a web 63 connecting the same, and a base plate 64.

As will be noted, the first supporting posts 33, 54, and 61 are all of the same size and external configuration, and similarly the second supporting posts 34, 55, and 62 are all of the same size and internal configuration, so that any one of the interlocking base elements 13, 14, or 15 may be joined to any other one of the same by inserting its first supporting post in the second supporting post of the other interlocking base element. By this arrangement, any desired combination of the interlocking base elements may be made for any particular installation. By reason of the frusto-conical form of all of the supporting posts, they fit snugly together, which is a feature of the invention. Also, as will be noted from Fig. 3, the webs 35, 56, and 63 project through the slots of the companion second supporting posts to lock therewith, which is also a feature of the invention. It will also be understood that although I have shown and described three base elements 13, 14, and 15 adapted to be so interlocked in assembly, I do not intend to be limited to such number as either more or less of the same may be employed, or different sized base elements may be used, without departing from the spirit of my invention.

As will also be understood, machine screws 66 and 67 are also provided to secure the first supporting posts 54 and 61 to the wall 16, and machine screws 68 and 69, similar to the screws 40 and 49, are provided to fit into the upper ends of the first supporting posts 54 and 61.

As will be apparent, in assembly the interlocking base elements 13, 14, and 15 are assembled in the desired relation relative to the tubings 17, 18, and 19, being secured to the wall 16 by the screws 41, 50, 66, and 67. In the process of this assembly, the third supporting post 45 is positioned within the second supporting post 34 of the interlocking base element 13, as shown in Fig. 1. The top straps 21, 52, and 59 are then placed over the tubings 17, 18, and 19, respectively, in the position shown in Fig. 1, and the screws 40, 49, 68, and 69 are inserted to clamp the top straps securely to the interlocking base elements and to rigidly retain therein the tubings. When assembled, the base plates 38, 47, 57, and 64 make a substantially continuous base plate support or structure, lending stability to the unit.

By this arrangement, it is possible to have on hand a stock of clamping elements similar to the clamping elements 10, 11, and 12, to fit all standard sized cables or tubings, so that when an installation is to be made the workmen need select only those of the proper size, assemble them in the correct relation for the cable or tubing run in question, thus greatly facilitating and simplifying the installation and reducing to a minimum possibility of error on the part of the workmen normally tending to delay and waste with prior art devices.

Fig. 5 shows an alternative form of interlocking base element 70, generally similar in form and operation to the base elements 13, 14, and 15, but differing slightly in construction. The base element 70 is provided with first and second supporting posts 71 and 72 connected by a web 73 and provided with a base plate 74, all similar to the corresponding elements of the embodiment illustrated in Figs. 1–4. A bottom strap 75 is provided, which, although similar in general configuration to the bottom straps 28, 53, and 60, is formed as a separate element, not being integrally connected to the posts 71 or 72, or the web 73. In this alternative construction the bottom strap 75 merely rests on and is suitably clamped relative to the posts 71 and 72 and the web 73, and may be desirable to simplify and cheapen fabrication.

Although I have shown and described as a preferred embodiment of my invention a clamping device for securing and clamping tubing or cable runs, it will be apparent to those skilled in the art that the device may be used for other clamping purposes without departing from the spirit of my invention. It will also be apparent that certain parts and elements of my construction, as disclosed herein, could be replaced by other parts or elements having similar functions without departing from the spirit of my invention, and consequently I do not desire to be limited by the foregoing disclosure, but desire to be afforded the full scope of the following claims.

I claim as my invention:

1. As an article of manufacture, a clamping means having connected to one end a first supporting post, and having connected to its other end a second supporting post, the second post having a chamber therein of the same shape and size as the external configuration of said first post.

2. As an article of manufacture, a supporting post which is frusto-conical in shape and having a supporting base and an external longitudinal rib parallel to the axis of the post and adapted to lock said post relative to a mating slot.

3. In a clamping device, the combination of: a strap having a semi-circular central section and two end portions; a first supporting post, the upper end thereof being connected to one of said end portions; and a second supporting post, the upper end thereof being connected to the other of said end portions, said second post having a longitudinal chamber therein shaped to receive snugly therein a post of the same external shape as said first post.

4. In a clamping device, the combination of: a strap having a semi-circular central section and two end portions in the same plane; a first supporting post, the upper end thereof being connected to one of said end portions by a thin neck; and a second supporting post, the upper end thereof being connected to the other of said end portions, said second post having a longitudinal chamber therein shaped to receive snugly therein a post of the same external shape as said first post, said second post having a slot therein adjacent its upper end of slightly greater width than said neck.

5. In a clamping device, the combination of: a strap having a semi-circular central section and two end portions in the same plane; a first supporting post, the upper end thereof being rigidly connected to one of said end portions; a second supporting post, the upper end thereof being rigidly connected to the other of said end portions, said second post having a longitudinal chamber therein shaped to receive snugly therein a post of the same external shape and size as said first post; and a base plate connected to said first post and extending beneath said strap but not beneath said second post.

6. In a clamping device, the combination of: a strap having a semi-circular central section and two end portions in the same plane; a first supporting post, the upper end thereof being connected to one of said end portions; a second supporting post, the upper end thereof being connected to the other of said end portions, said second post having a longitudinal chamber therein shaped to receive snugly therein a post of the same external shape as said first post; and a web connecting said posts and having a semi-circular opening in the top thereof adapted to support said strap.

7. In a clamping device, the combination of: a first strap having a semi-circular, depending, central section and two end portions in the same plane; a first supporting post, the upper end thereof being connected to one of said end portions; a second supporting post, the upper end thereof being connected to the other of said end portions, said second post having a longitudinal chamber therein shaped to receive snugly therein a post of the same external shape as said first post; a second strap having a semi-circular central section of the same radius as said first central section and adapted to form with said first central section when placed together therewith a circular opening; and means for securing said second strap relative to said first strap so as to form said circular opening.

8. In a clamping device, the combination of: a strap having a semi-circular central section and two end portions in the same plane; a first supporting post, the upper end thereof being connected to one of said end portions; a second supporting post, the upper end thereof being connected to the other of said end portions, said second post having a longitudinal chamber therein shaped to receive snugly therein a post of the same external shape as said first post; and a third supporting post adapted to fit into said chamber and support said second post.

9. In a clamping device, the combination of: clamping means; and a plurality of interlocking base elements adapted to support said clamping means, each of said base elements including a first post and a second post and an interconnecting member, said second post having an opening therein of the same shape as the external shape of said first post and adapted to receive a first post of another of said base elements to interlock said base elements.

10. In a clamping device, the combination of: clamping means; a plurality of interlocking base elements adapted to support said clamping means, each of said base elements including a first post and a second post and an interconnecting member, said second post having an opening therein of the same shape as the external shape of said first post and adapted to receive a first post of another of said base elements to interlock said base elements; and a separate end post adapted to fit into one of said second posts to support the same and close the chamber thereof.

WENDELL S. FLETCHER.

REFERENCES CITED

The following references are of record in the file of this patent:

UNITED STATES PATENTS

| Number | Name | Date |
| --- | --- | --- |
| 2,250,732 | Svendsen | July 29, 1941 |
| 2,209,477 | Reibel | July 30, 1940 |